United States Patent
Holland et al.

(10) Patent No.: US 9,645,782 B2
(45) Date of Patent: May 9, 2017

(54) MULTIPLE DISPLAYS FOR DISPLAYING WORKSPACES

(71) Applicant: Apple Inc., Cupertino, CA (US)

(72) Inventors: Philip J. Holland, Ypsilanti, MI (US); Assana M. Fard, Sunnyvale, CA (US); John O. Louch, Santa Barbara, CA (US); Kristin M. Forster, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/083,223

(22) Filed: Mar. 28, 2016

(65) Prior Publication Data

US 2016/0210102 A1    Jul. 21, 2016

Related U.S. Application Data

(63) Continuation of application No. 13/858,701, filed on Apr. 8, 2013, now Pat. No. 9,298,338.

(51) Int. Cl.
| | |
|---|---|
| G06F 3/14 | (2006.01) |
| G06F 3/0481 | (2013.01) |
| G06F 9/44 | (2006.01) |
| G06F 3/048 | (2013.01) |

(52) U.S. Cl.
CPC ........... *G06F 3/1423* (2013.01); *G06F 3/048* (2013.01); *G06F 3/0481* (2013.01); *G06F 3/1431* (2013.01); *G06F 9/4443* (2013.01)

(58) Field of Classification Search
CPC ......... G06F 3/14; G06F 3/1423; G06F 3/0481

USPC .......................................................... 715/781
See application file for complete search history.

(56) References Cited

U.S. PATENT DOCUMENTS

| | | | |
|---|---|---|---|
| 6,717,556 B2 | 4/2004 | Asahi et al. | |
| 9,298,338 B2 | 3/2016 | Holland | |
| 2004/0252074 A1 | 12/2004 | Schaper | |
| 2006/0038741 A1 | 2/2006 | Mori et al. | |
| 2010/0085382 A1* | 4/2010 | Lundqvist | G06F 1/1616 |
| | | | 345/659 |
| 2012/0081267 A1 | 4/2012 | Sirpal et al. | |
| 2012/0081270 A1 | 4/2012 | Gimpl et al. | |
| 2012/0290946 A1 | 11/2012 | Schrock et al. | |
| 2013/0100001 A1* | 4/2013 | Reeves | G06F 3/1438 |
| | | | 345/1.3 |

OTHER PUBLICATIONS

Google brings dual monitor, extended desktop support to Chrome OS, 2007-2012 Liliputing, 8 pages.

(Continued)

*Primary Examiner* — Andrea Leggett
(74) *Attorney, Agent, or Firm* — Robert C. Kowert; Meyertons, Hood, Kivlin, Kowert & Goetzel, P.C.

(57) ABSTRACT

A first workspace, which may include one or more windows, may be associated with a first display device. A second workspace, which may also include one or more windows, may be associated with a second display device. The first and second workspaces may be provided for display to the first and second display devices, respectively. The first and second display devices may be independent such that manipulation a window of the first workspace across a coordinate location of the second display device does not affect the second display device.

20 Claims, 8 Drawing Sheets

(56) References Cited

OTHER PUBLICATIONS

International Search Report and Written Opinion from PCT/US2014/033138, mailed Jul. 8, 2014, pp. 1-4.
Patent Examination Report No. 1 from Australian Patent Application No. 2014251190, Date of issue Jun. 16, 2016, Apple Inc., pp. 1-3.

* cited by examiner

MULTIPLE DISPLAYS FOR DISPLAYING WORKSPACES

This application is a continuation of U.S. patent application Ser. No. 13/858,701, filed Apr. 8, 2013, now U.S. Pat. No. 9,298,338, which is hereby incorporated by reference herein in its entirety.

BACKGROUND

Modern operating systems employ graphical user interfaces for displaying information. It has become common in recent years for users to use multiple displays to implement an extended desktop. The extended desktop allows the various graphical user interfaces to be freely moved from display to display, or even mirrored across the multiple displays.

SUMMARY

In one embodiment, a first workspace, which may include one or more windows, may be associated with a first display device. A second workspace, which may also include one or more windows, may be associated with a second display device. The first and second workspaces may be provided for display to the first and second display devices, respectively. The first and second display devices may be independent such that manipulation of a window of the first workspace across a coordinate location of the second display device does not affect the second display device (e.g., does not result in that window of the first workspace being displayed on the second display device.

In various embodiments, the associations of workspace to display device may be stored. The stored associations may be used to reconfigure a workspace to a display device, for example, when a display device is reconnected or when a new display device is connected. In some embodiments, one or more of the workspaces may include a full screen window for an application executing in full screen mode. As a simple non-limiting example, a two display system may be configured to simultaneously display two full screen windows, one on each display.

While the disclosure is described herein by way of example for several embodiments and illustrative drawings, those skilled in the art will recognize that the invention is not limited to the embodiments or drawings described. It should be understood that the drawings and detailed description are not intended to limit the disclosure to the particular forms disclosed, but on the contrary, the intention is to cover all modifications, equivalents and alternatives falling within the spirit and scope of the present disclosure. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, in a display environment having multiple display devices, the terms "first" and "second" display devices can be used to refer to any two of the multiple display devices. In other words, the "first" and "second" display devices are not limited to logical display devices 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The specification first describes several examples of a multiple, independent display device system displaying multiple workspaces, followed by an example method for displaying multiple workspaces on multiple, independent display devices. The specification then describes an example two-display system configured to implement the disclosed techniques followed by an example computer system.

Figure 1:
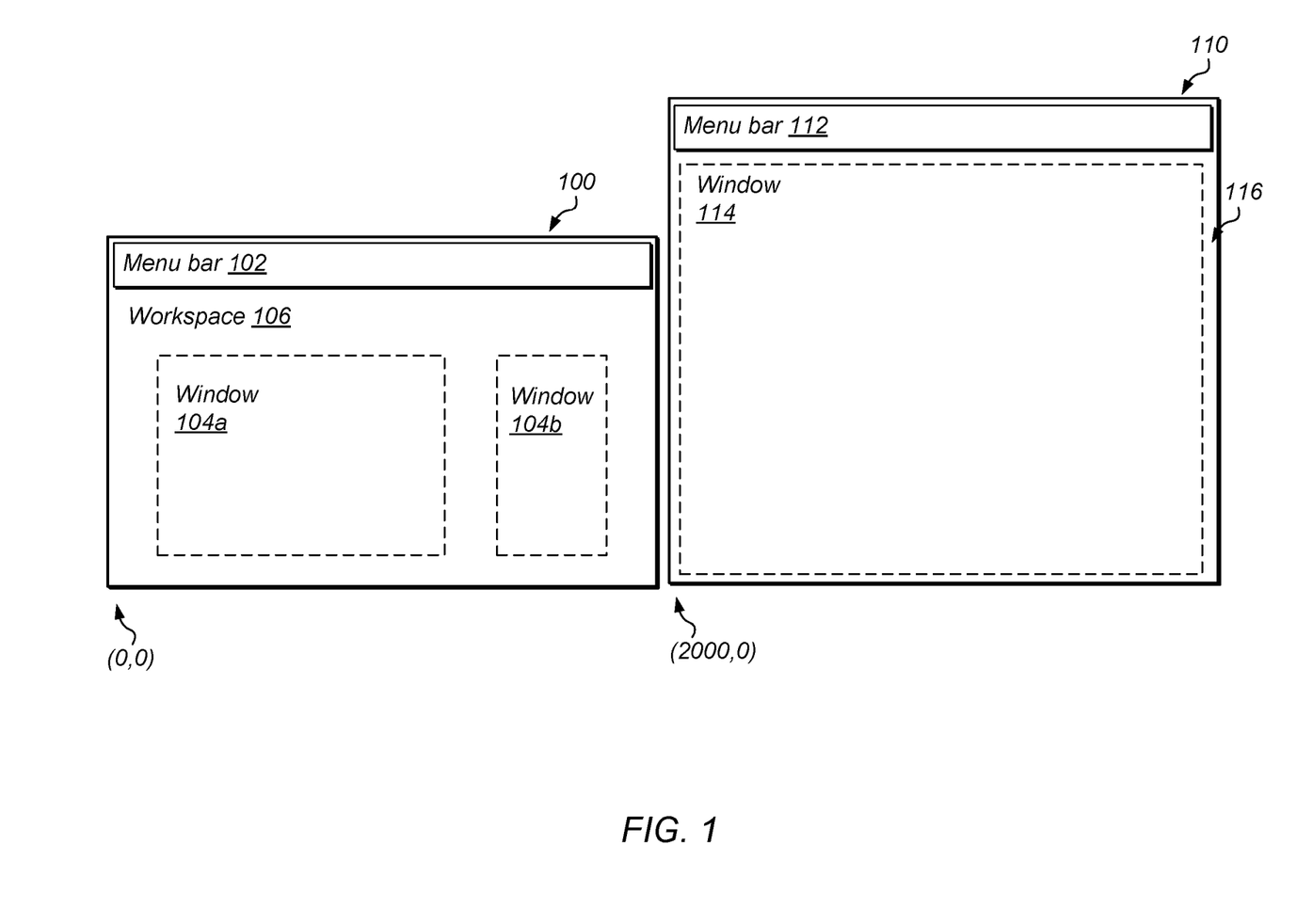
FIGS. 1-5 illustrate various examples of multiple, independent display devices displaying multiple workspaces, according to some embodiments.

Turning now to the Figures, FIG. 1 illustrates a multiple, independent display device system displaying multiple workspaces. Display devices 100 and 110 may be any type of display, such as a display of a desktop computer, laptop computer, tablet computer, mobile device, stand-alone external monitor/display, projector, television, and/or some other display device. Display devices 100 and 110 may be configured to display a respective workspace, such as workspaces 106 and 116, and the windows of those workspaces.

A workspace may be associated with a grouping, also referred to as a stack, of one or more windows and may also be associated with a respective display device. Thus, in the example of FIG. 1, workspace 106 may include windows 104a and 104b and may be associated with display device 100. Workspace 116 may include window 114 and may be associated with display device 110. Note that a window can be associated with one workspace or multiple workspaces.

Windows 104a, 104b, and 114 may be windows of an operating system or graphical user interfaces of one or more applications. Example applications may include a drawing application, a presentation application, a word processing application, a calendar application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application, a digital content application, etc. In the example of FIG. 1, windows 104a and 104b may be from the same application or from different application. As shown, windows 104a and 104b of workspace 106 may not be executing in full screen mode. Window 114, however, is illustrated as a full screen window for an application executing in full screen mode. In other examples, workspace 106 may also include an application executing in full screen mode as well such that each of the multiple display devices displays a different full screen window for one or more applications executing in full screen mode at the same time.

In one embodiment, a workspace may be associated with, or assigned to, a display device. Association of a workspace to a display device may include associating the various windows to a workspace and to a display device. That association, assignment, and/or a state of the association may be maintained. The maintained association may include information regarding, configuration, layout, and/or size of the various windows of the workspace and/or display device parameters of the display device such as resolution, size, etc.

As described herein, the maintained state may facilitate reconfiguration of the workspace upon disconnecting a display device and reconnecting the display device or connecting a different display device such that a user's configuration of the workspace may be restored and/or transferred to a different display. In such a manner, a user may quickly restore the user's desired configuration with minimal or no reconfiguring, resizing, and/or relocating of windows. For example, an association of workspaces to display devices for a user's office devices (e.g., laptop display device and external monitor), which may include layout, sizing, and/or other configuration parameters of the windows and/or workspace, may be maintained. The configuration from the maintained association may then be used when the user reconnects his laptop to the external monitor in the user's office and/or when the user connects his laptop to a different external device (e.g., external monitor at home), thereby potentially saving the user time and increasing productivity.

As illustrated in FIG. 1, workspace 106 may be associated with menu bar 102 and workspace 116 may be associated with menu bar 112. Menu bars 102 and 112 may include common menu bar options and/or different menu bar options. For example, menu bar 102 may be related to the currently selected window from workspace 106, such as window 104a, which may be a window for a calendar application. Menu bar 112 may be related to window 114, which may be a window for a mail application. Therefore, in such an example, menu bar 112 options may include mail options and menu bar 102 may include calendar options. Note that when a window is in full screen mode, the corresponding menu bar for that screen may be in an auto-hidden mode such that the menu bar is not visible until the user moves the mouse (or finger or comparable selection tool) over the area of the display containing the auto-hidden menu bar.

Also shown in the example of FIG. 1 are example global coordinates for the global display real estate. The lower left corner of display device 100 is shown as (0,0) and the lower left corner of display device 110 is (2000,0). Note that in other examples, another portion of the device (e.g., upper left) may have coordinates (0,0). In one embodiment, display devices 100 and 110 may be independent such that there may not be straddling of the display devices (e.g., a window or workspace overlapping and being displayed by both multiple display devices). Accordingly, a given workspace may be displayed on a single display device at a time. Thus, if a user attempts to drag workspace 106 and/or windows 104a/104b from display device 100 into a location that partially intersects the coordinates of display device 110, the dragged workspace 106 and/or windows 104a/104b may not affect display device 110. Instead, the dragged workspace and/or windows will move off screen from display device 100 but not onto display device 110. Thus, in such an embodiment, the display devices may be independent of each other and not extended desktops of each other. Note, however, that if a user attempts to drag workspace 106 and/or windows 104a/104b entirely off the coordinates of display device 100 and onto the coordinates of display device 110, then the dragged workspace 106 and/or windows 104a/104b may then be displayed on display device 110. Further note that multiple workspaces may be associated with and displayed on a single display device at the same time, in some embodiments. For example, both workspaces 106 and 116 may be associated with and displayed on display device 100.

In one embodiment, the primary display device may, in the absence of a specification otherwise, default to having its lower left corner (or other corner) be (0,0) with the secondary display device located to the immediate right of the primary display. Note than other display device configurations in the global coordinate space are supported (e.g., top-bottom displays, primary display on the right, etc.). Moreover, in other examples, neither display device may be the primary display device. In those other examples, one of the display devices may be assigned as the primary display device with a lower left corner of (0,0).

Users may interact with the various windows on the display devices via a physical user-interface device, such as a touch-sensitive surface, a mouse, a stylus, physical buttons on a device housing the display device, etc. In one embodiment, control of one of the displayed windows may be initiated with an affirmative selection (e.g., touching the window with the touch-sensitive surface, clicking the mouse over the window, etc.) of the window. As described herein, the menu bar that is displayed for a given display device may correspond to the active window of the active workspace.

Figure 2:
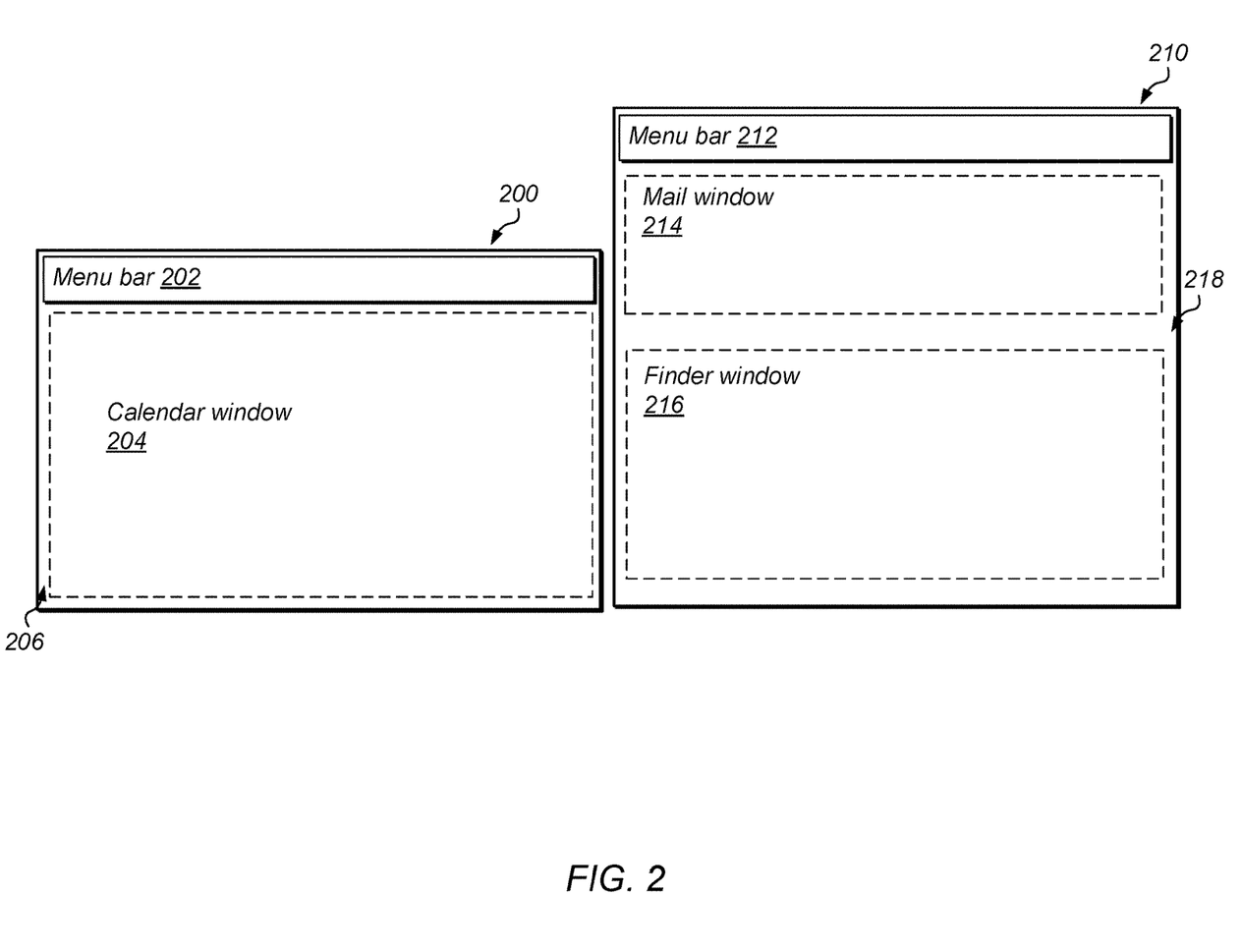

Turning to FIG. 2, another example multiple, independent display device system displaying multiple workspaces is illustrated. Similar to FIG. 1, workspace 206 may be associated with display device 200 and may include calendar window 204. As shown, calendar window 204 is a full screen window resulting from a calendar application executing in full screen mode. Workspace 218 includes mail window 214 and finder window 216 of mail and finder applications, respectively, and is associated with display device 210. Each of workspaces 206 and 218 are associated with a respective menu bar 202 and 212.

As described herein, the association of the workspaces to display devices and, in some embodiments, to windows, may be stored. Accordingly, the stored associations may be used to reconfigure multiple display devices when one display device is no longer in communication with the device executing the applications and/or when a display device is reconnected/connected to the device executing the applications.

Figure 3:
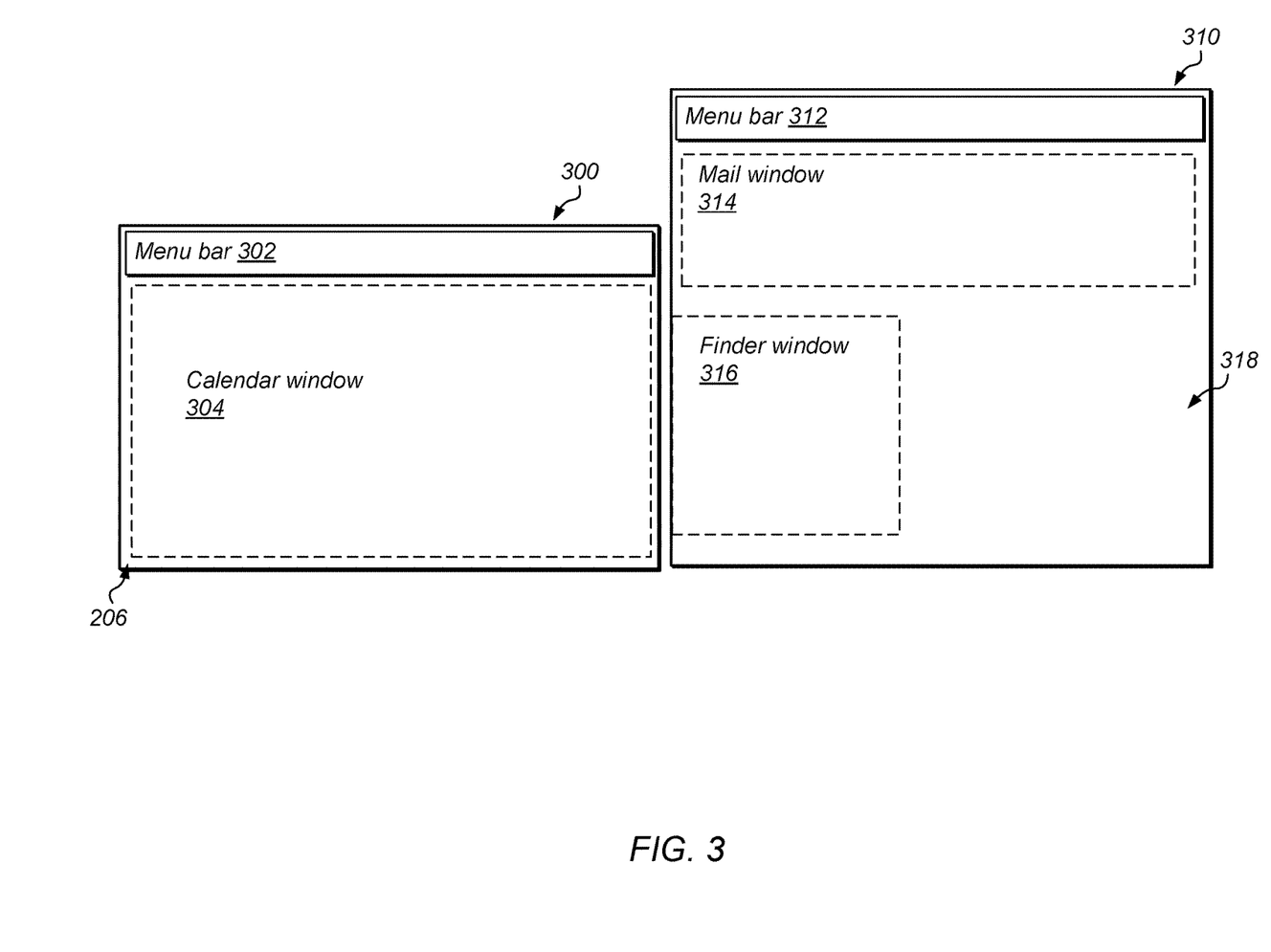

FIG. 3 illustrates another example of a multiple, independent display device system displaying multiple workspaces. FIG. 3 is similar to the example of FIG. 2 and illustrates the independence of the two example displays. As shown in FIG. 3, a user has moved finder window 316 to the left of workspace 318, off the display of display device 310, and onto the coordinate space of display device 300. Unlike an extended desktop in which finder window 316 would extend onto display device 300 and straddle both displays, because finder window 316 is associated with workspace 318, which is associated with display device 310, the display of finder window 316 in this example simply moves partially off display device 310 but does not affect the display of display device 300 (or workspace 306 or calendar window 304), even though the coordinates of finder window 316 overlap those of display device 300. Note that, however, in some embodiments, a request may be received (e.g., by the operating system) to display a window of one workspace on a display not associated with the workspace. Upon processing the request, the operating system may permit an application to display windows on more than one display (e.g., a photo editing application with a window showing the image current being edited on one display device and another window showing the folder in which that image is stored).

Figure 4:
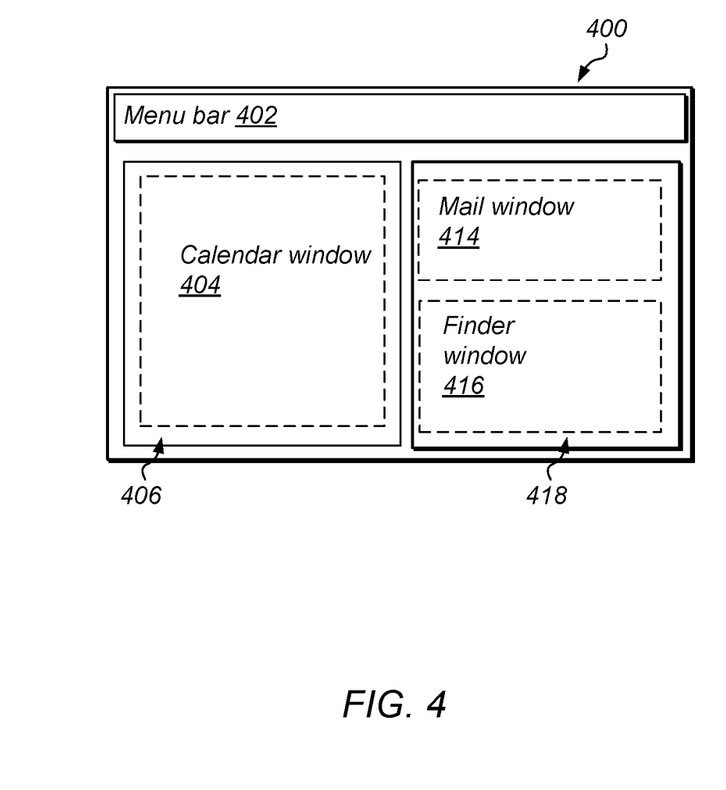

FIG. 4 illustrates another example of a multiple, independent display device system displaying multiple workspaces. The example of FIG. 4 represents a scenario in which display device 210 of FIG. 2 is no longer in communication with the device executing the applications. Accordingly, display device 400 is shown displaying the workspace that was associated with the second display device, such that display device 400 now displays both of workspaces 406 and 418 and their associated windows, calendar window 404, mail window 414, and finder window 416. Note that in this example, calendar window 404 is no longer in full screen mode as it was in FIG. 2.

Figure 5:
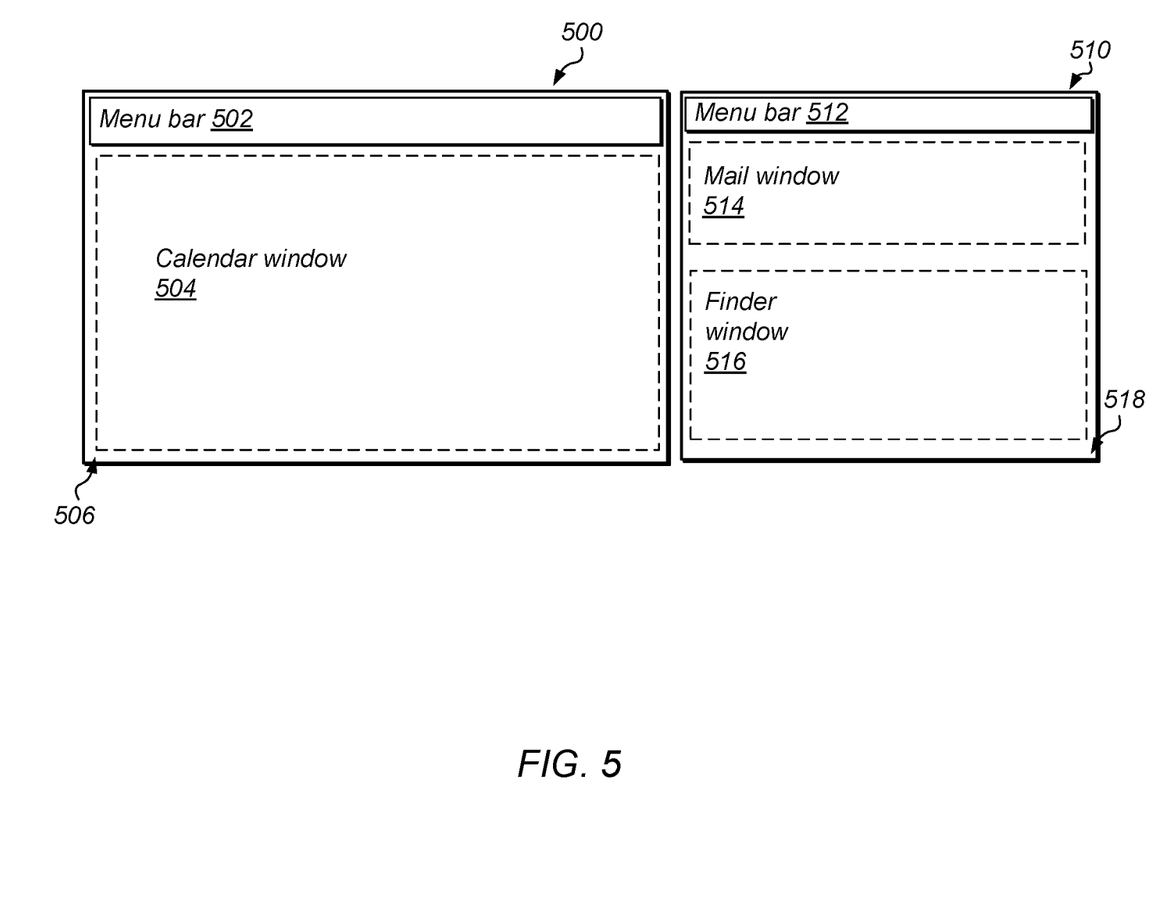

FIG. 5 illustrates another example of a multiple, independent display device system displaying multiple workspaces and builds upon the examples shown in FIGS. 2 and 4. FIG. 5 illustrates a scenario in which a new display device is in communication with the device executing the applications. For example, FIG. 2 may represent a user's office configuration with display device 200 corresponding to the user's laptop and display device 210 corresponding to their office external display. FIG. 5 may represent the user's home configuration with display device 500 being the display of the same laptop as display device 200 and with display device 510 being the user's home external display.

According to the disclosed techniques, the stored association of FIG. 2 may facilitate the reconfiguration of workspace 518 for display on new display device 510 and may restore the full screen display of calendar window 504 on workspace 506 and display device 500. As shown in this example, display device 510 is smaller than display device 210 resulting in a scaled version of the workspace and its associated windows. As described herein, as part of the stored/maintained association, various display parameters may also be stored such that when another display device, with different parameters than were present during the original association, is connected, the stored association may be used to generate new dimensions and display coordinates of the windows and workspace. In some embodiments, reconfiguring the workspace for the new display device may result in the creation of a new association of the workspace to the display device, which may replace the original/old association for that workspace, or may be stored in addition the original association for that workspace. In one embodiment, the original association may be the default association that is used should both display devices that are associated with the workspace be connected at the same time resulting in the workspace only being displayed on one of those simultaneously connected display devices. Note that the default workspace to display device association may also be user defined.

Note that in another example, instead of new display device 510 being connected to the computing device, display device 210 may be reconnected. In such a scenario, the configuration of example of FIG. 2 may be recreated based on the stored association of workspace 218 to display device 210.

Numerous other not illustrated examples exist. For instance, both workspaces may include an application executing in full screen mode such that multiple full screen windows may be present at the time. Moreover, the disclosed techniques may also apply to systems having more than two display devices. For example, a first workspace may include one or more first windows and may be associated with a first display device. A second workspace may include one or more second windows and may be associated with a second display device. And a third workspace may include one or more third windows and may be associated with a third display device, and so on.

Figure 6:
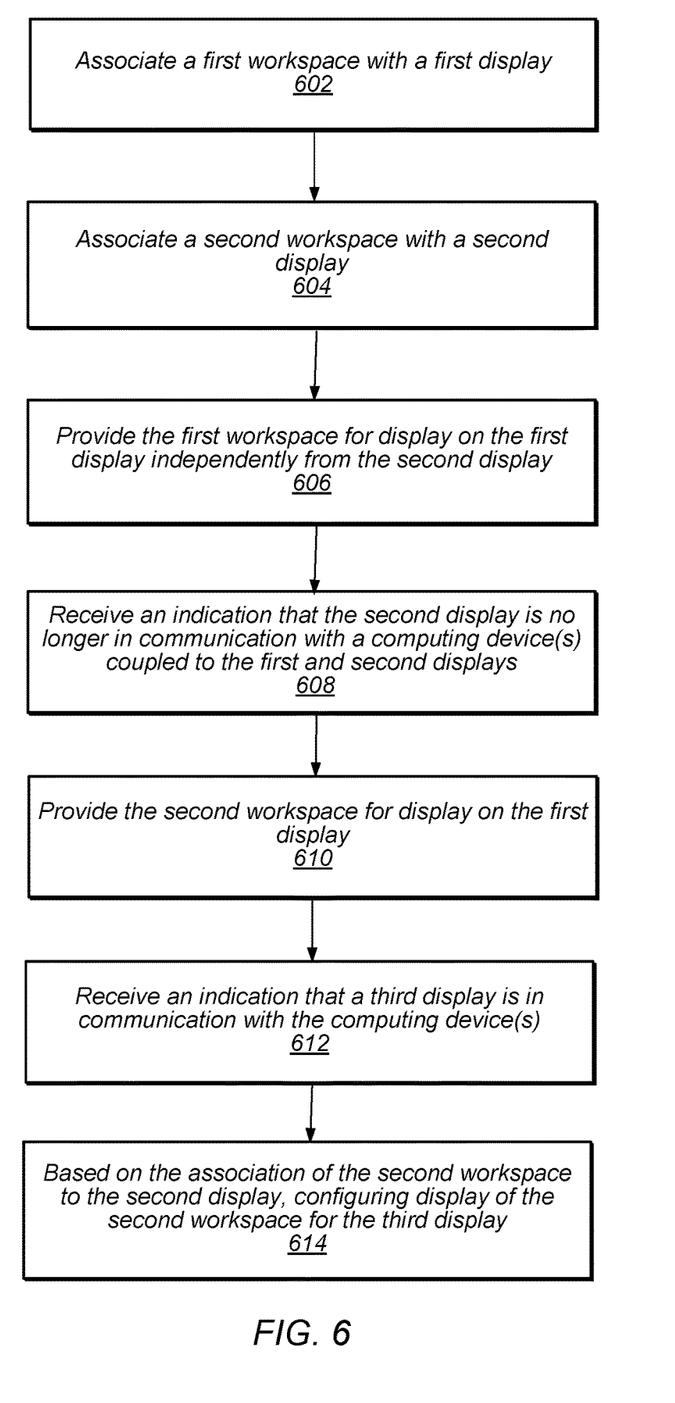
FIG. 6 illustrates a flowchart for displaying various workspaces on multiple, independent display devices, according to some embodiments.
Figure 7:
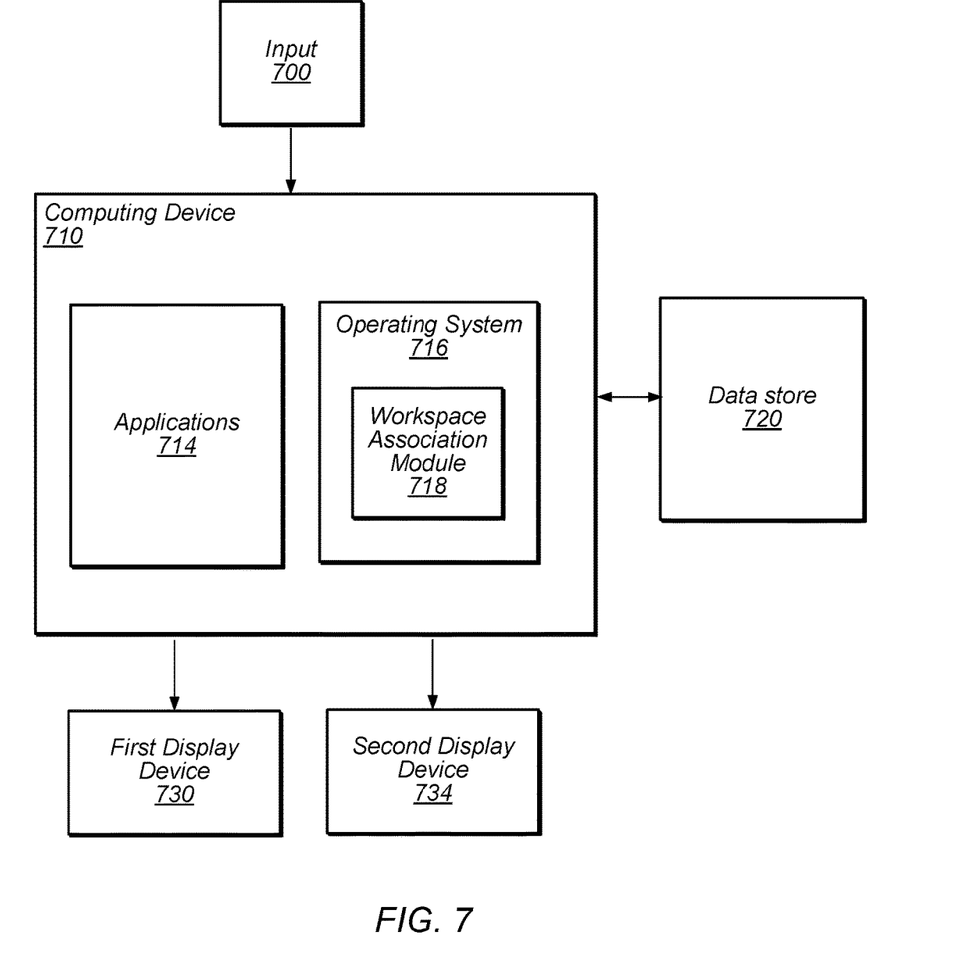
FIG. 7 is a block diagram illustrating one embodiment of a system configured to implement the disclosed techniques for displaying various workspaces on multiple, independent display devices.

Turning now to FIG. 6, one embodiment of a method for displaying various workspaces on multiple, independent display devices is illustrated. While the blocks are shown in a particular order for ease of understanding, other orders may be used. In some embodiments, the method of FIG. 6 may include additional (or fewer) blocks than shown. Blocks 602-614 may be performed automatically or may receive user input. In one embodiment, the method of FIG. 6 may be performed by an operating system (e.g., the workspace association module), as shown in FIG. 7.

As shown at 602, a first workspace may be associated with a first display device and at 604, a second workspace may be associated with a second display device. As described herein, a workspace may be associated with and/or include one or more windows (e.g., graphical user interfaces of an application) and may also be associated with a display device. In one embodiment, one or more of the workspaces includes an application (and the application's respective window/interface) executing in full screen mode. An example of an application in full screen mode is shown in FIG. 2 (e.g., window 204 of workspace 206). Note that in other examples, each workspace may include a window in full screen mode such that multiple full screen applications may be displayed on the multiple displays at the same time.

In some embodiments, the associations of the first workspace to the first display device and/or the second workspace to the second display device may be maintained. For example, the associations (and/or a state of the associations) may be stored in a data store. The stored associations, or configurations, may be usable to restore the configurations of the workspaces.

As illustrated at 606, the first workspace may be provided for display on the first display device independently from the second display device. Independence of the first and second display devices may result in manipulation of a window of one of the workspaces, across a coordinate location corresponding to the display not associated with that workspace, not altering that display. For example, manipulation of a window of the first workspace across a coordinate location corresponding to the second display device may not alter the second display device. Thus, manipulating a window of the first workspace in such a manner may not alter the second display device in that such a manipulation may not result in that window of the first workspace being displayed on the second display device. Accordingly, such manipulation may not result in straddling of a workspace or window across the two display devices. An example of the independence of the display devices is shown in FIG. 3.

Similarly, the second workspace may be provided for display on the second display device. Manipulation of a window of the second workspace, across a coordinate location corresponding to the first display, may not alter the display of the first display device.

In some embodiments, the respective workspaces may be associated with a respective menu bar. The respective menu bars may be different from each other in at least one respect. The menu bars may be associated with one or more of the workspaces' respective windows. For example, one menu bar may be a calendar related menu bar that permits a user to add new appointments, schedule a meeting, etc. Another menu bar may be a mail related menu bar that permits a user to compose a new mail message, forward a mail message, etc.

As shown at 608, an indication may be received that one of the display devices is no longer in communication with the computing device(s) that implements the workspace association module (and in some embodiments, executes the applications that display their respective windows on the display devices). For example, the second display device may no longer be coupled to the computing device(s). For instance, a user may have unplugged/disconnected an external monitor from the user's laptop (computing device) resulting in the external monitor no longer being in communication with the laptop. As another example, the external display device may not be active (e.g., in a standby mode, off, disconnected, etc.).

At 610, the second workspace may be provided for display on the first display device. Providing the second workspace for display on the first display device may be performed in response to receiving the indication that the second display device is not active at block 608. Providing the second workspace for display on the first display device may be performed automatically or after user input confirming to provide the second workspace to the first display device.

In some embodiments, providing the second workspace for display on the first display device may result in modifying the configuration of the first workspace on the first display device. An example of the modified configuration of the first workspace is shown in FIG. 4. In the example, the first and second workspaces each receive a roughly equal portion of the display real estate of the first display device. In other examples, an application that was in full screen mode may have its associated workspace prioritized to receive a larger portion of the display real estate than the other (e.g., newly added) workspace and windows.

In one embodiment, displaying the second workspace on the first display may include determining the size of the first display (e.g., size of the display screen) and comparing it to the size (and/or other parameters) of the display associated with the second workspace from the second workspace's stored association. In such an embodiment, displaying the second workspace may be performed according to the determined size of the first display device relative to the associated display device's size.

As illustrated at 612, an indication may be received that a third display is in communication with the computing device(s). For example, the third display may be the same display as the second display such that the indication is an indication that the second display has regained communication with the computing device(s). Or, in some embodiments, the third display may be a different display than the second display. For example, the second display device may be a user's office external monitor whereas the third display device may be the user's home external monitor, tablet device, television, etc. The indication that the third display device is in communication with the computing device may be the result of connecting the display to the computing device(s), whether via cable, wirelessly, or some other interface.

As shown at 614, based on the association of the second workspace to the second display device, display of the second workspace may be configured for the third display device. For example, in an embodiment in which the second display device is the same display as the third display device, the display of the window(s) of the second workspace may be restored such that the configuration, layout, size, etc. of the second workspace and its respective windows are recreated.

As noted, the third display device may be a different display device than the second display device. In such embodiments, configuring display of the second workspace for the third display device may also be based on one or more parameters (e.g., size, resolution, aspect ratio, etc.) of the third display device. A simple example is shown in FIG. 5 where the third display device is a smaller device (shown as display device 510) than the display device that was disconnected (shown in FIG. 2 as display device 210).

In various embodiments, a request may be received (e.g., by the operating system from an application) to display a window of one workspace on a display device not associated with that workspace. In response to receiving that request, the request may be granted or denied. If granted, that window may be provided for display to the display device not associated with that workspace. In one embodiment, that window may then be displayed along with the windows of the workspace associated with that device. In another embodiment, display of that window may replace display of the windows of the other workspace.

As one example, consider a scenario in which one or more first windows are associated with a first workspace and a first display, and one or more second windows are associated with a second workspace and a second display. A first application may, when running, generate one or more of the one or more first windows. The first application may then request permission (e.g., based on user input or automatically) to also display a window on the second display (e.g., a calendar application with a month view of a calendar in one window on one display and an agenda view in a window on the other display). Upon granting the request, the operating system may permit the first application to display window(s) (e.g., full screen or otherwise) on both the first and second display. In one embodiment, the window(s) of the first application displayed on the second display may replace the one or more second windows of the second workspace whereas in another embodiment, the window(s) of the first application displayed on the second display may replace the one or more second windows. In that latter embodiment, display of the one or more second windows may be restored upon terminating permission of the window(s) of the first application to display on the second display. Such termination may be based on user request, a time out, closing the window(s) of the first application that are on the second display, upon a subsequent request by an application associated with the second workspace (e.g., a superseding request), etc. Note that when an application or workspace is permitted to display on multiple displays, straddling of windows across those displays (e.g., extended desktop) may be permitted. However, once permission has terminated, display device independence is restored.

Example System

FIG. 7 illustrates an embodiment of operating system 716 configured to implement workspace association module 718. As noted above, workspace association module 718 may implement various embodiments of the disclosed techniques. The illustrated embodiment includes computing device 710 that is configured to implement various applications 714, operating system 716, and workspace association module 718.

Workspace association module 718, which may be implemented in software, hardware, or a combination of both, as part of an operating system, may be configured to perform the disclosed techniques for facilitating display of workspaces on a respective display of multiple displays, independently. For example, workspace association module 718 may be configured to associate a first workspace that includes one or more first windows to the first display device as a first association. Workspace association module 718 may also be configured to associate a second workspace that includes one or more second windows to a second display device as a second association. Additionally, workspace association module 718 may be configured to provide the first and second workspaces for display to first and second display devices 730 and 734, respectively. First and second display devices 730 and 734 are independent such that manipulation of a window of the first workspace in first display device 730 across a coordinate location corresponding to second display device 734 does not result in the first workspace being displayed on second display device 734.

As described herein, the associations of workspace to display device may be stored in a data store, such as data store 720. Accordingly, the stored associations may be retrieved and/or used by operating system 716 and workspace association module 718 to restore/reconfigure a workspace upon connecting/reconnecting a display device. Although data store 720 is illustrated as separate from computing device 710, in some embodiments, data store 720 may be a data store that is part of computing device 710.

Example Computer System

Figure 8:
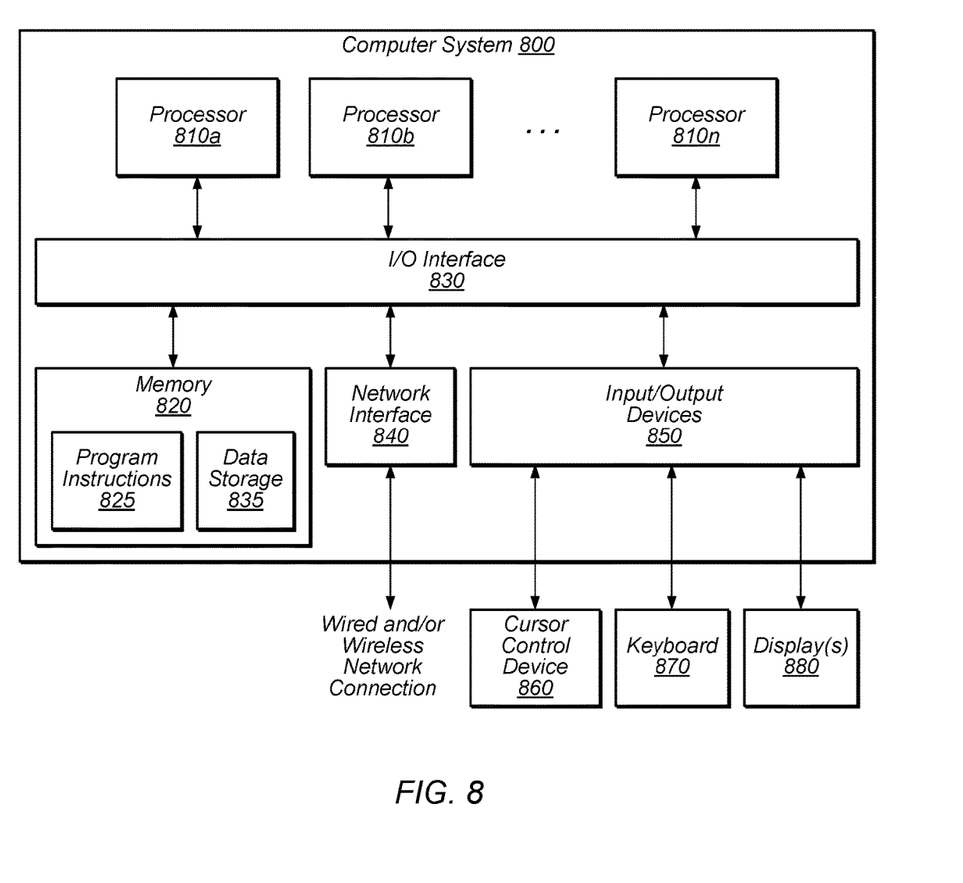
FIG. 8 is a block diagram illustrating an example computer system capable of implementing the disclosed techniques for displaying various workspaces on multiple, independent display devices.

FIG. 8 illustrates computer system 800 that may be configured to implement the embodiments described above. In different embodiments, the computer system may be any of various types of devices, including, but not limited to, a personal computer system, desktop computer, laptop, tablet device, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 800 includes one or more processors 810*a*-810*n* coupled to system memory 820 via input/output (I/O) interface 830. The computer system further includes network interface 840 coupled to I/O interface 830, and one or more input/output devices 850, such as cursor control device 860, keyboard 870, and one or more displays 880, such as first and second display devices. In some embodiments, it is contemplated that embodiments may be implemented using a single instance of a computer system 800, while in other embodiments may be implemented on multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for displaying various workspaces on multiple, independent display devices may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method for displaying various workspaces on multiple, independent display devices, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals (e.g., multiple display devices), keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions 825, configured to implement embodiments of a workspace association module as described herein, and data storage 835, comprising various data accessible by program instructions 825. In one embodiment, program instructions 825 may include software elements of a method for multiple, independent display devices displaying multiple workspaces illustrated in the above Figures. Data storage 835 may include data that may be used in embodiments. In other embodiments, other or different software elements and/or data may be included.

Those skilled in the art will appreciate that computer system 800 is merely illustrative and is not intended to limit the scope of displaying various workspaces on multiple, independent display devices as described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
    first and second display devices; and
    a computing device coupled to the first and second display devices, wherein the computing device is configured to implement a workspace association module of an operating system configured to:
        associate a first workspace that includes one or more first windows to the first display device as a first association, wherein the first association comprises coordinates of the first workspace with respect to coordinates of the first display device in a global coordinate space comprising the first and second display devices;
        associate a second workspace to a second display device as a second association, wherein the second association comprises coordinates of the second workspace with respect to coordinates of the second display device in the global coordinate space; and
        provide the first and second workspaces for display to the first and second display devices based on the first association and the second association, respectively, wherein a movement interaction of one of the one or more first windows in the first display device across a coordinate location corresponding to the second display device does not result in the one of the one or more first windows being displayed on the second display device upon completion of the movement interaction.

2. The system of claim 1, wherein the workspace association module is further configured to:
    store the first and second associations to a data store.

3. The system of claim 1, wherein the workspace association module is further configured to:
    receive an indication that the second display device is no longer coupled to the computing device;
    receive an indication that a third display device is coupled to the computing device; and
    based on the second association, configuring the second workspace for display on the third display device.

4. The system of claim 3, wherein the third display device is different from the second display device.

5. The system of claim 1, wherein at least one of the one or more first windows includes a full screen window for an application executing in full screen mode.

6. The system of claim 1, wherein the one or more first windows is a first full screen window, and wherein the first and second display devices are configured to display first and second full screen windows, respectively.

7. The system of claim 1, wherein the workspace association module is further configured to:
    receive a request to display a window of the one or more first windows on the second display device; and
    provide the window of the one or more first windows for display to the second display device.

8. The system of claim 7, wherein to provide the window of the one or more first windows for display to the second display device, the workspace association module is further configured to replace display of the second workspace on the second display device with the window.

9. A method, comprising:
    performing, by an operating system running on a computing device:
        maintaining a first state of an association of a first workspace to a first display coupled to the computing device, wherein the association of the first workspace comprises coordinates of the first workspace with respect to coordinates of the first display in a global coordinate space comprising a plurality of displays;
        maintaining a second state of an association of a second workspace to a second display coupled to the computing device, wherein the association of the second workspace comprises coordinates of the second workspace with respect to coordinates of the second display in the global coordinate space; and
        providing the first workspace for display on the first display based on the association of the first workspace, wherein a movement interaction of a window of the first workspace across a coordinate location corresponding to the second display does not display any portion of the window on the second display upon completion of the movement interaction.

10. The method of claim 9, wherein the first workspace includes an application in a full screen mode.

11. The method of claim 9, further comprising providing the second workspace for display on the second display, wherein a movement interaction of a window of the second workspace across a coordinate location corresponding to the first display does not display any portion of the window on the first display upon completion of the movement interaction.

12. The method of claim 9, further comprising:
receiving an indication that the second display is no longer in communication with the one or more computing devices; and
providing the second workspace for display on the first display.

13. The method of claim 12, further comprising:
receiving an indication that the second display has regained communication with the one or more computing devices; and
based on the maintained second state, restoring display of the second workspace on the second display.

14. The method of claim 12, wherein providing the second workspace for display on the first display includes providing a modified configuration of the first workspace to the first display.

15. The method of claim 9, further comprising:
receiving an indication that the second display is no longer in communication with the one or more computing devices; and
receiving an indication that a third display is in communication with the one or more computing devices; and
based on the maintained second state and on one or more parameters of the third display, configuring display of the second workspace on the third display.

16. A non-transitory computer-readable storage medium, storing program instructions computer-executable on a computer to implement:
maintaining a first association of a first workspace that includes one or more first windows to a first display device, wherein the first association comprises coordinates of the first workspace with respect to coordinates of the first display device in a global coordinate space comprising a plurality of display devices;
maintaining a second association of a second workspace that includes one or more second windows to a second display device, wherein the second association comprises coordinates of the second workspace with respect to coordinates of the second display device in the global coordinate space; and
providing the first and second workspaces for display to the first and second display devices based on the first association and the second association, respectively, wherein a movement interaction of one of the one or more first windows across a coordinate location corresponding to the second display device does not display a portion of the one of the one or more first windows on the second display device upon completion of the movement interaction.

17. The non-transitory computer readable medium or media of claim 16, wherein the program instructions are further computer-executable to implement:
receiving an indication that the second display device is not active; and
providing the second workspace for display on the first display device.

18. The non-transitory computer readable medium or media of claim 17, wherein providing the second workspace for display on the first display device includes providing a modified configuration of the first workspace to the first display device.

19. The non-transitory computer readable medium or media of claim 16, wherein the program instructions are further computer-executable to implement:
receiving an indication that the second display device is not active;
after receiving the indication that the second display device is not active, receiving an indication that a third display device is active; and
configuring the second workspace for display on the third display device according to the maintained second association.

20. The non-transitory computer readable medium or media of claim 19, wherein the third display device is different from the second display device.

* * * * *